US009686649B2

(12) United States Patent
Weizman et al.

(10) Patent No.: US 9,686,649 B2
(45) Date of Patent: Jun. 20, 2017

(54) DETERMINATION OF DEVICE LOCATION IN CROWDED INDOOR ENVIRONMENTS

(71) Applicant: Intel IP Corporation, Santa Clara, CA (US)

(72) Inventors: Raz Weizman, Beer Sheva (IL); Noam S. Brousard, Tel Aviv (IL); Liraz Goldenthal, Ramat-Gan (IL); Idan Gutman, Givatayim (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/657,686

(22) Filed: Mar. 13, 2015

(65) Prior Publication Data

US 2016/0269860 A1    Sep. 15, 2016

(51) Int. Cl.
*H04W 24/00*    (2009.01)
*H04W 4/02*    (2009.01)
(Continued)

(52) U.S. Cl.
CPC ........... *H04W 4/023* (2013.01); *H04W 4/008* (2013.01); *H04W 4/06* (2013.01); *Y02B 60/50* (2013.01)

(58) Field of Classification Search
CPC .......... G01S 5/14; G01S 5/0036; G01S 11/02; H04W 64/00; H04W 36/32; H04W 4/04; H04W 4/02; H04W 4/021
(Continued)

(56) References Cited

U.S. PATENT DOCUMENTS 7,463,907 B2 * 12/2008 Smith ................... H04B 3/542
                                                      455/41.2
2006/0217132 A1    9/2006 Drummond-Murray et al.
(Continued)

FOREIGN PATENT DOCUMENTS

EP          2673999 B1    11/2014
WO    2016/148798 A1    9/2016

OTHER PUBLICATIONS

International Search Report and Written Opinion received for PCT Patent Application No. PCT/US2016/016790, mailed on May 24, 2016, 15 pages.

*Primary Examiner* — Don N Vo
(74) *Attorney, Agent, or Firm* — Law Office of R. Alan Burnett, PS

(57) ABSTRACT

Methods and apparatus for determining device location in crowded indoor environments. A mobile device is configured to determine its location using a Wi-Fi Time of Flight (ToF)-based location scheme. Once the device determines it location, it may broadcast its location to nearby devices using a low energy location sharing mechanism that employs low energy broadcast signals identifying the location of the device. The low energy broadcast signals may be used by other devices having a similar configuration, as well as devices that don't use the ToF-based location scheme to determine their locations using RSSI measurements and multi-lateration and/or have such capabilities disabled. The location of a device may be updated by fusing location data derived from the ToF-based location scheme with location data received from nearby devices that are broadcasting their locations using the low energy location sharing mechanism. The sharing mechanism reduces the number of ToF sessions, while also reducing power consumption by using the lower energy broadcasts to share location data.

21 Claims, 8 Drawing Sheets

(51) Int. Cl.
*H04W 4/06* (2009.01)
*H04W 4/00* (2009.01)

(58) Field of Classification Search
USPC ........................................................ 455/456.1
See application file for complete search history.

(56) References Cited

U.S. PATENT DOCUMENTS

| | | | |
|---|---|---|---|
| 2010/0015999 A1 | 1/2010 | Belz et al. | |
| 2010/0190509 A1* | 7/2010 | Davis .................. | H04W 56/006 455/456.1 |
| 2011/0119024 A1* | 5/2011 | Nam ....................... | G01S 5/021 702/150 |
| 2012/0208461 A1* | 8/2012 | Choi ..................... | H04W 4/008 455/41.2 |
| 2012/0289243 A1 | 11/2012 | Tarlow et al. | |
| 2014/0253385 A1 | 9/2014 | Amizur et al. | |
| 2015/0080021 A1* | 3/2015 | Bietz .................... | H04B 1/3877 455/456.1 |
| 2015/0119077 A1* | 4/2015 | Buchheim ............... | G01S 1/042 455/456.1 |

* cited by examiner

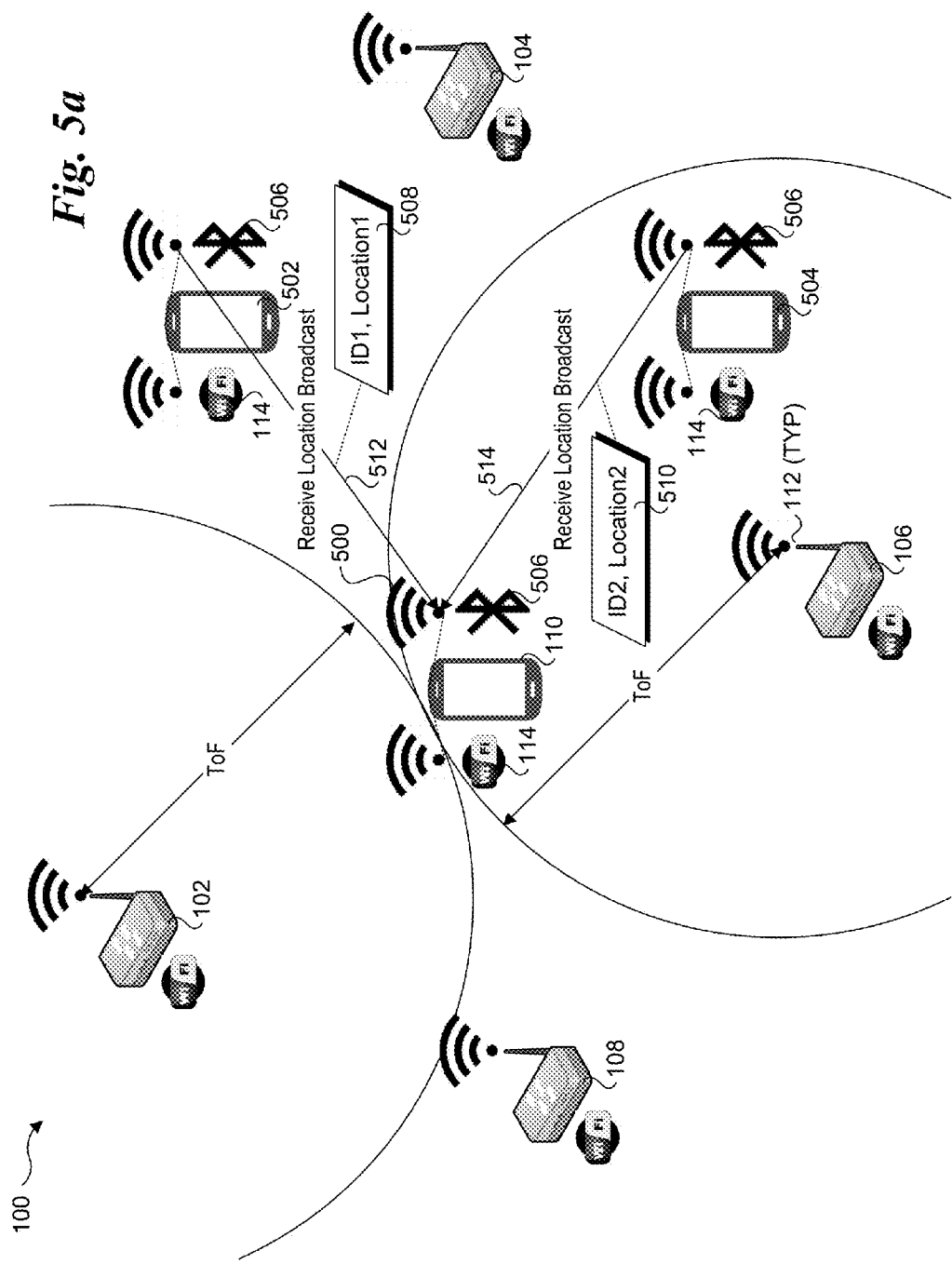

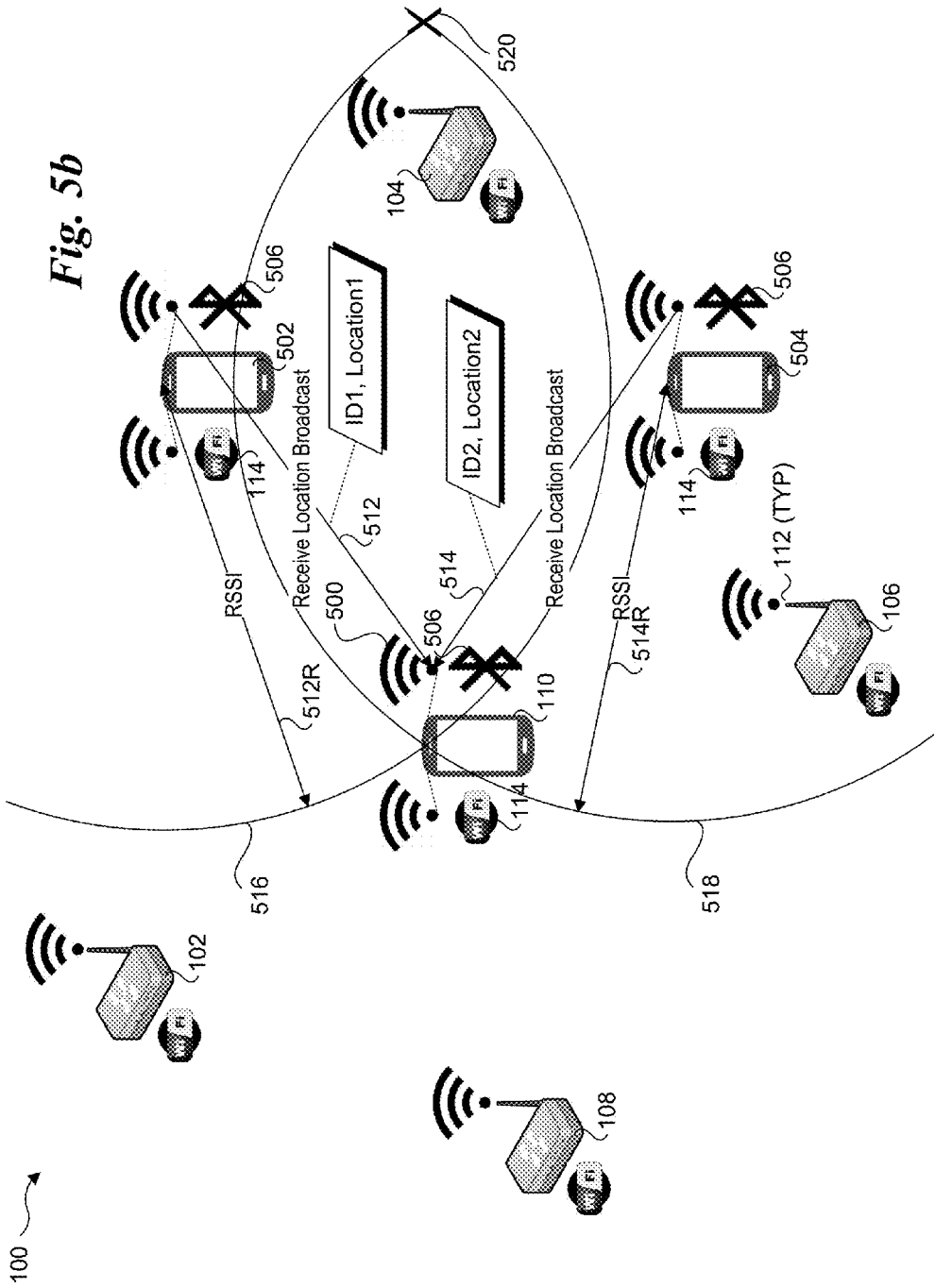

DETERMINATION OF DEVICE LOCATION IN CROWDED INDOOR ENVIRONMENTS

CROSS-REFERENCE TO RELATED APPLICATIONS

The present application contains subject matter related to U.S. application Ser. No. 14/580,689, entitled LOCATION BLE BEACON, filed on Dec. 23, 2014. Both applications are subject to assignment to Intel Corporation.

BACKGROUND INFORMATION

The use of location-aware applications and services in mobile environments has seen tremendous growth ever since APPLE added GPS capabilities to the iPhone 3G in 2008. For example, at APPLE's World Wide Developer Conference in 2014, it was announced that more than 600,000 iOS applications were using APPLE's location services API (Application Program Interface). Similarly, 100's of thousands of location-aware applications are available for ANDROID devices, and location service are provided by Microsoft for Window Phones, Surface tablets, and other mobile devices running Microsoft Windows operating systems.

Ideally, it is preferable to obtain the most accurate location for a mobile device as might be available for the given use context. GPS is a fundamental feature that is provided with most of today's mobile phones. To locate a device that has GPS support, a GPS receiver in the device receives signals from three or more GPS satellites, and calculates the location of the device using well-known positioning algorithms based on the amount of time it takes for a signal to be transmitted between a given GPS satellite and the device in combination with very accurate GPS location data. However, the use of GPS is generally restricted to outdoor environments where line of sight to GPS satellites is available. Moreover, there is a significant portion of mobile devices that do not have built-in GPS support, such as most tables, laptops, and notebooks.

Another technique for locating a mobile device is through the use of radio signal trilateration. Historically, E911 support for mobile phones was typically facilitated through the use of location determination using cell towers. Under this approach, the location of the cell towers are known, and radio signal strength measurements are obtained from multiple cell towers and used to trilaterate the location of the phone. This produces rather coarse location results that are impractical in today's mobile environments; for example, under E911 Phase 2, mobile network operators are required to provide the latitude and longitude of callers within 300 meters. By comparison, GPS may be accurate to within a few meters in some environments.

To add location capabilities to devices that either don't have GPS support and for locations for which GPS is unavailable, APPLE (and others) have deployed location services that employ Wi-Fi base stations (aka, access points) to trilaterate the location of a mobile device based on Received Signal String Indication (RSSI) measurements of access point broadcast signals obtained by the mobile device. A similar RSSI-based trilateration scheme is employed to determine the location of the device based on known (or at least projected to be known) location of Wi-Fi access points. This entails gathering the location of literally millions of Wi-Fi access points, which originally was accomplished by companies such as Skyhook through "wardriving," under which GPS-equipped vehicles are driven along streets and used to identify the location of Wi-Fi access points by their broadcast MAC addresses. More recently, APPLE and GOOGLE have employed crowdsourcing techniques under which the APPLE and ANDROID devices themselves are used to generate the location of new Wi-Fi access points (and/or update the location of existing Wi-Fi access points). Under APPLE's approach, an iOS device has a local database that includes the location of thousands of Wi-Fi access points, using their MAC addresses as a key. iOS devices, including iPads without GPS support, are enabled to trilaterate the location of a new Wi-Fi access point using RSSI measurements and provide corresponding location information to APPLE's crowdsourced location database. Under GOOGLE's approach, the ANDROID device sends information pertaining to RSSI measurements obtained from the new Wi-Fi access points and (potentially) other access points, along with GPS position information (if available). The location of the new Wi-Fi access point is then determined by GOOGLE's location services servers and added to the location database.

The crowdsourced Wi-Fi access point approach works well in environments with relatively sparse (Wi-Fi access point) densities and for some inside environments (e.g., within a home or a wood-framed structure), but has several drawbacks for high-density environments and when within larger buildings. One drawback is that RSSI measurements are subject to attenuation and other effects, making Wi-Fi access points "appear" to be located at different locations than their actual locations. Another problem is that some Wi-Fi access points provide a stronger broadcast signal than others, making such access points appear relatively closer than they actually are.

A second Wi-Fi based location technique uses Time of Flight (ToF) technology, where a Wi-Fi device establishes a ToF session with several access points, usually 3-4 or more for high accuracy. The device keeps the session alive for as long as the indoor location is required with all of the access points and open new sessions to other access points as the device is moved. Generally, the ToF technology achieves high accuracy for indoor locations, but also demands high power consumption from the Wi-Fi core components. Using the ToF technology for long time periods can have a significant negative effect on the device's battery.

When a high and dense number of users are using ToF in very crowded places like malls, train stations, stadiums, etc. the total number of ToF sessions would be very high. Considering a limited number of access points deployed, each of the access points would have to maintain hundreds of ToF sessions in order to support all the ToF users. Maintaining this number of sessions isn't feasible due to network and channel limitations and therefore the indoor location user experience would be drastically diminished.

In addition, when there's a shortage of access points to provide for so many ToF users, the number of collisions between ToF users increases. This can cause the general noise (white noise) in the environment to rise and as a consequence the access points would demand from all of the ToF users to raise their transmitter power. This problem would make the usage in ToF technology in indoor crowded environments even more power consuming.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 5a is a schematic diagram illustrating a wireless device receiving location information from two nearby mobile devices using a low energy location sharing mechanism, according to one embodiment;

FIG. 5b is a schematic diagram illustrating the wireless device of FIG. 5a determining its location relative to the two nearby mobile devices using RSSI measurements of the low energy broadcast signals broadcast by the two nearby mobile devices.

DETAILED DESCRIPTION

Figure 1:
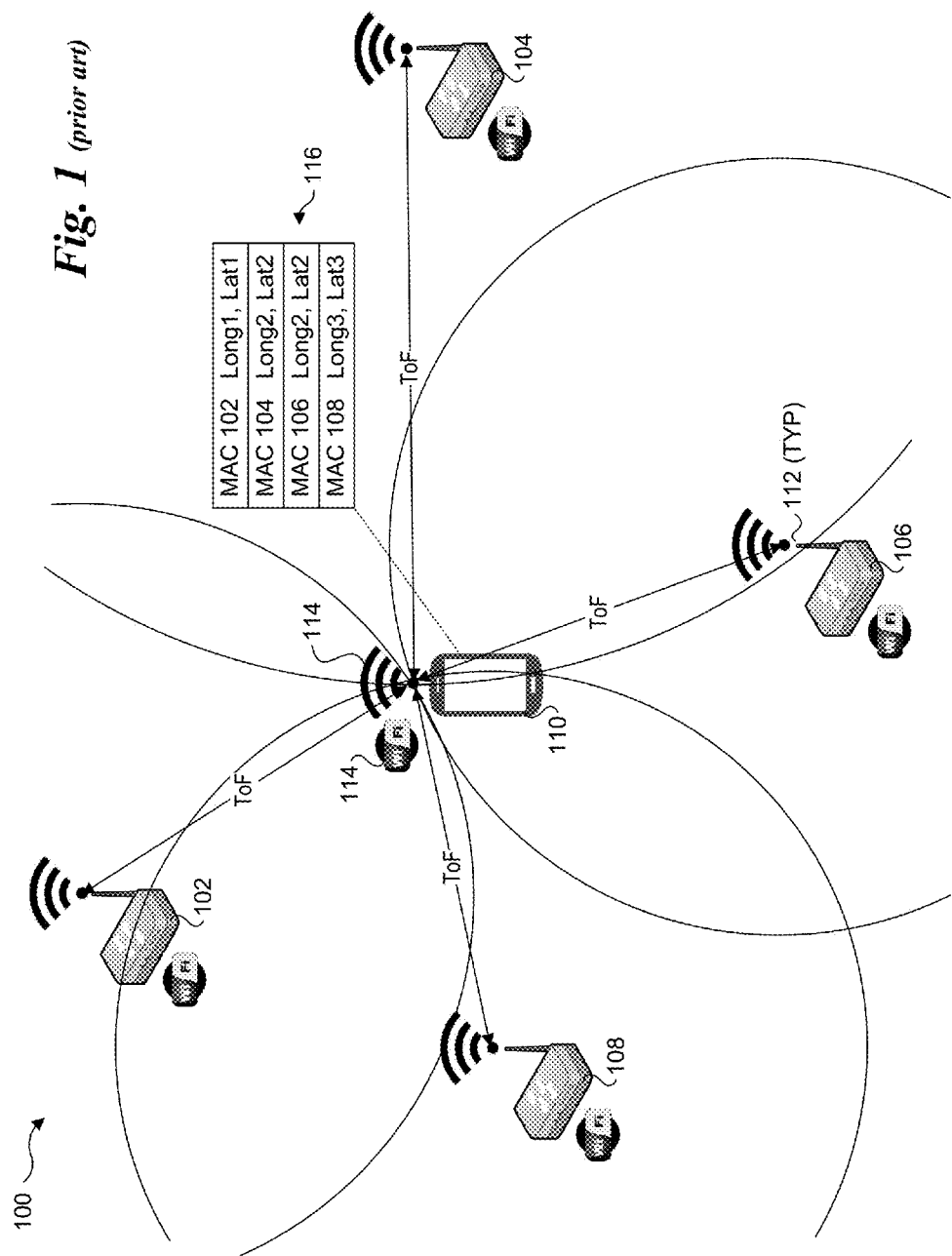
FIG. 1 is a schematic diagram illustrating an exemplary scheme for determining to location of a mobile device using Time of Flight (ToF) measurements.

Embodiments of methods and apparatus for determining device location in crowded indoor environments are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

FIG. 1 depicts an indoor environment 100 that includes four Wi-Fi access points 102, 104, 106, and 108, and a mobile device 110. Wi-Fi (which originally stood for Wireless-Fidelity) is a wireless local area network (WLAN) technology that employs 2.4 GHz and 5 GHz signals, as defined by corresponding Institute of Electrical and Electronics Engineers (IEEE) 802.11 standards. Each Wi-Fi access point has a respective antenna 112, while mobile device 110 may have one-or more antennas, including a Wi-Fi antenna. Mobile device 110 further provides a Wi-Fi radio subsystem including a transmitter, receiver, and antenna, and is also depicted as participating in four ToF sessions.

Unlike techniques that determine location based on RSSI measurements, ToF requires communication between a mobile device and a Wi-Fi access point. To estimate the distance between two devices (e.g., the mobile device and the Wi-Fi access point, a packet is transmitted between the devices. The time required for the packet to travel from one device to the other and back is called the round trip time (RTT). The distance the packet traveled can be obtained by multiplying RTT with the speed of light (c), leading to the following formula for the distance d between two devices:

$$d = c * \frac{RTT}{2} \quad (1)$$

Under one embodiment, RTT is measured at the MAC layer using Wi-Fi beacon packets, which do not require ACKnowledgements (ACKs), nor require Wi-Fi access point association and authentication. In one embodiment an approach described in Wibowo, S. B.; Klepal, M.; Pesch, D., *Time of Flight Ranging Using Off-the-Self IEEE 802.11 Wi-Fi Tags*. Proceedings of the International Conference on Positioning and Context-Awareness (PoCA '09), Antwerp, Belgium, 28 May 2009, is implemented. This is merely an example of one technique for measuring ToF and not limiting, as other location determination techniques based on ToF principles may also be implemented.

Figure 2:
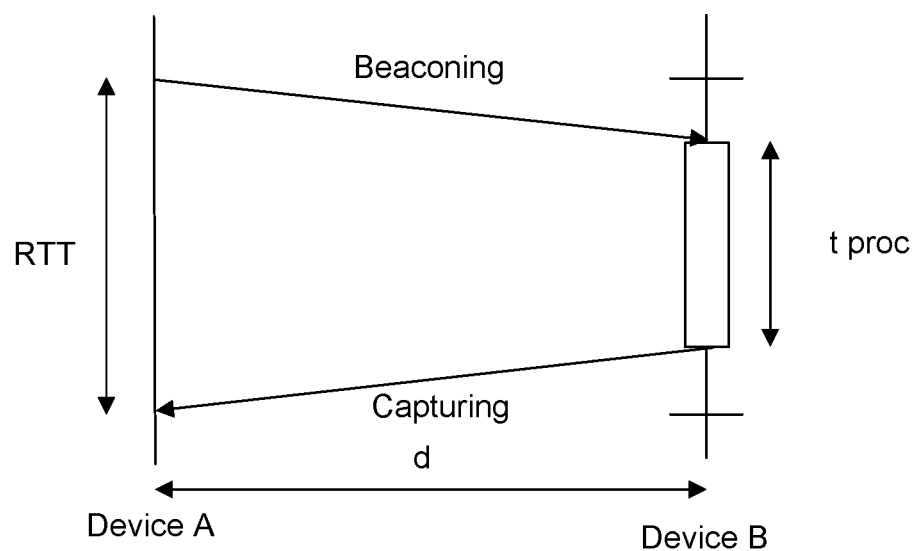
FIG. 2 is a diagram illustrating an exchange of messages and timing information pertaining to determining a ToF measurement, according to one scheme.

Two devices A and B, separated by a distance d are shown in FIG. 2. Packet destinations are identified by the MAC address of the destination node and devices A and B only consider packets with their own MAC address. To measure the distance, packets need to be exchanged at least twice. The first packet exchange is used for recording a timestamp in each device. Device A initiates the beacon and just before the beacon is sent, the timestamp is recorded. Once the packet is received by device B, the receiving timestamp is recorded. Then, in response, device B generates a beacon packet reply with the same beacon sequence number. As with Device A, just before packet transmission, the sending timestamp is saved in device B.

Once the beacon response packet is received by device A, the timestamp is recorded. Although four timestamps can be recorded during a single packet exchange, the round trip time cannot be calculated because the timestamps of device B cannot be transmitted during a single exchange to device A. The second packet exchange is required to transmit device B's receiving and sending timestamps to device A.

As shown in FIG. 1, there is a processing latency (t proc) that is incurred between when a beacon is received and when a beacon reply is returned. Through the use of the timestamps, this latency can be identified and subtracted from the RTT observed at Device A to obtain the true RTT. Another way to view this is that an RTT of t proc is considered a zero meter distance, and thus the actual distance is, $$d = c * \frac{RTT - t\ proc}{2} \quad (2)$$

Preferably, a good sampling of measurements are taken, and then statistically processed to determine a more accurate distance d.

Under another approach, timestamping is implemented at the Physical layer (PHY) rather than the MAC layer. Generally, the RTT calculations are still carried out at the MAC layer, but it is envisioned that future Wi-Fi access points may include support for performing both timestamping and RRT calculations at their PHYs.

Figure 3:
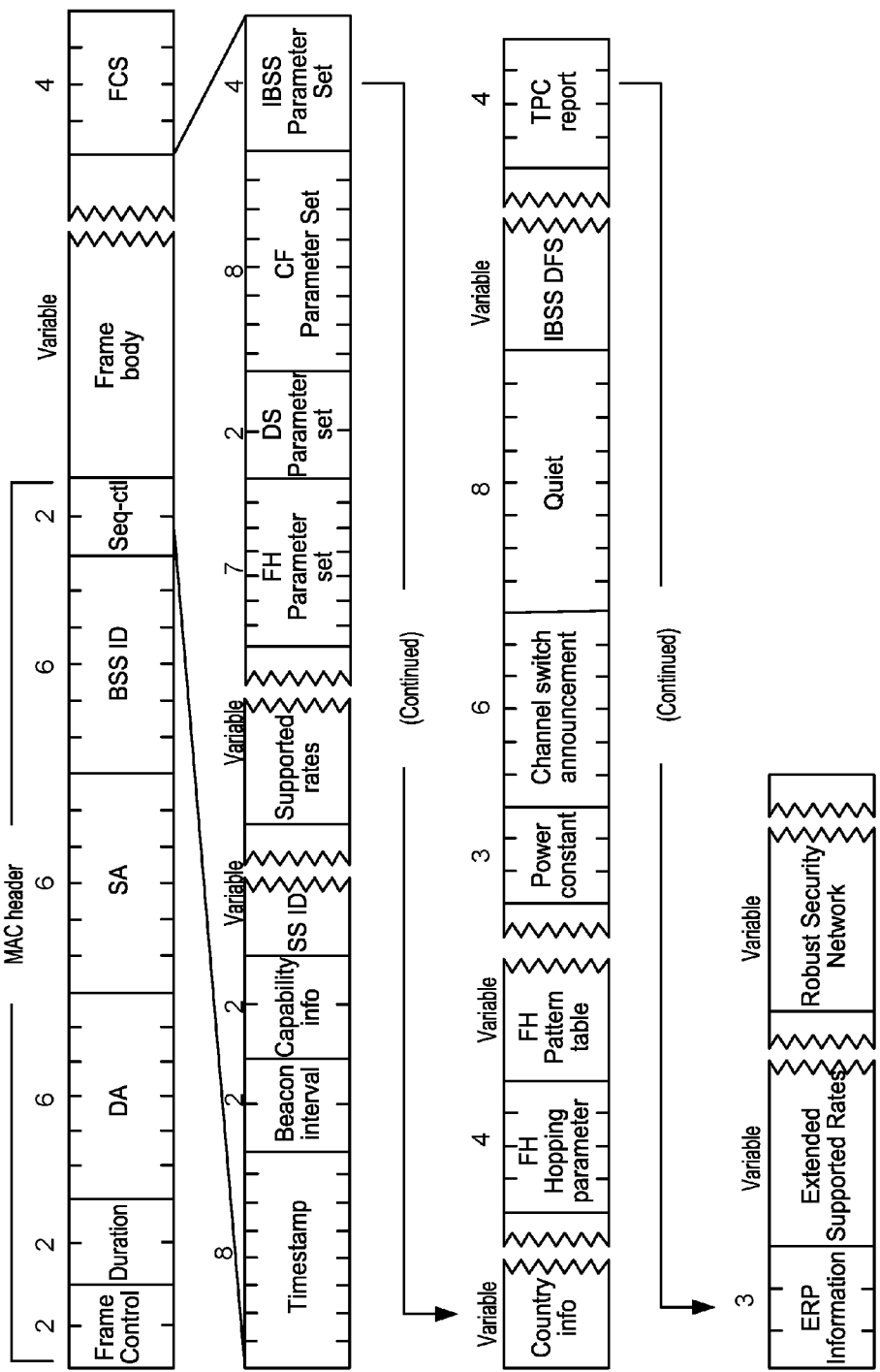
FIG. 3 is a diagram illustrating a Wi-Fi access point MAC beacon signal.

FIG. 3 shows the format of a Standard IEEE 802.11 beacon frame. The Timestamp field is used to store an (up to) 64-bit timestamp. In one embodiment, clock cycles are used for the timestamps. Other timestamp sources may also be used in a similar manner. The MAC header also includes the MAC Destination Address (DA), the MAC Source Address (SA), the Base Service Set identification (BSS ID), and the sequence control. Also, as depicted in FIG. 3, there are many optional fields that are not used.

As illustrated in FIG. 1, mobile device 110 employs four ToF sessions (and corresponding RTT measurements) to determine its location through multi-lateration (quadlateration is this example). Under alternative implementations, mobile device 110 either has a database of Wi-Fi access points including MAC addresses with corresponding location coordinates (e.g., latitude and longitude in one embodiment), or the location information can be retrieved from a location service server by providing the MAC addresses of the Wi-Fi access points to the location service server.

By knowing the location of Wi-Fi access points 102, 104, 106, and 108 in combination with the ToF distance information, a mobile device can accurately determine its location indoors or otherwise in locations for which GPS is unavailable or is errant. However, this comes at a cost, both in terms of the increased power consumption for establishing and maintaining ToF sessions with multiple Wi-Fi access points, and also in the extra connections each Wi-Fi access point needs to support. Moreover, while ToF provides an accurate location measurement, it does not scale well, particularly for high-density environments.

In accordance with further aspects of the embodiments discussed herein, a significant portion of the ToF sessions in indoor crowded environment are offloaded using an indoor location sharing mechanism. This approach enables mobile devices to maintain a lower number of ToF sessions (e.g. 1 or 2) with the Wi-Fi access points, while also receiving indoor location inputs using a location sharing mechanism that ensures their location accuracy stays high.

Under one embodiment of the approach, each ToF user that is aware of its position with high accuracy anonymously broadcasts its location using a low power technology, such as BLUETOOTH® Low Energy (BLE), for instance, to its surroundings in a low transmitter (Tx) power mode. These broadcasts are transmitted periodically and are capable of being received by nearby devices (e.g., any device that is within the signal reception range of the Tx). A device that would like to use these location broadcasts opens its low power receiver, and receives one or more location broadcasts for nearby devices. For each broadcasting node, the RSSI of the signal broadcast by that node is determined. Using a proximity algorithm, the device then translates the RSSI into a corresponding distance. Since the indoor location sharing mechanism is targeted for implement in dense environments, there typically might be several nodes for each device that would broadcast their location. The device collects the location broadcasts and fuses this data in combination with ToF data to accurately determine its location. It is projected that due to the dense environment of users, there would be a good density of BLE location broadcasters. This would compensate for the relative inaccuracy of the distance measuring by BLE RSSI and would provide even higher location accuracy.

In one embodiment, in order to prevent location error drifting, only devices that have at least one ToF session broadcast their location. Other devices that don't have ToF capability are enabled to determine their location using the low energy broadcasts, but are not permitted to share their location with other devices using low energy broadcasts.

The approach used by the embodiments provide improvements over known solutions with respect to at least two aspects. First, when the number of ToF users in very crowded environments increases, the ToF service level significantly degrades, as explained above. This may even cause a complete denial of service for a large portion of the ToF users due to a very high load on the access points. For example, such denial of service conditions may exist during rush hours in locations such as train stations, or for other high-density environments. The more crowded the environment, the greater the likelihood the ToF solution would be degraded. In addition, when a high number of Wi-Fi ToF users creates collisions in the air, the latency of the messages increase due to the back-off algorithms that are generally used to support confirmed delivery of data, such as Transmission Control Protocol (TCP). Such delays result in a very poor user experience.

In contrast, under the approach implemented by the embodiments herein, the number of concurrent ToF users (in the same environment) is reduced by a factor of approximately 3 or 4 times. Or another way to look at it, the embodiments enable the number of users who can use ToF with good service quality to be multiplied by a factor of 3 to 4 times relative to the conventional ToF approaches used today. As a result, the approach supports a much larger number of users concurrently without negative impact on the location accuracy.

The second aspect relates to reducing the power consumption of the indoor location process. ToF technology alone is a very power consuming technology that requires the Wi-Fi core operations to consume a lot of energy for the high accurate calculations and transmissions. Moreover, in crowded environments the level of the noise increases, which results in access points demanding that their Wi-Fi users increase their Tx power. Performing all of the ToF protocol in a high Tx power mode results in even a greater amount of power consumption.

Under the embodiments herein, the number of ToF sessions between devices and access points is reduced, which also reduces the level of noise. In some embodiments, the low energy broadcasts could be made using a different band than the ToF session (e.g., 2.4 GHz band for the low energy sharing technology and 5 GHz band for the Wi-Fi ToF). As a consequence, the number of colliding ToF users decreases, as does the overall noise level. Reducing both the number of ToF sessions per user and the level of noise in the environment provides a significant effect on the power consumption of the indoor location process, even when considering the usage of another technology to obtain the location broadcasts.

As described above, in order to enable an accurate indoor location service in very crowded environments there is a need to reduce the number of ToF sessions. In order to reduce the number of ToF sessions and maintain the high accuracy location obtained from the ToF technology, a location sharing mechanism is provided that receives location inputs from other sources. In addition, the location sharing mechanism is a low power location sharing mechanism that is implemented using low energy technology.

Figure 4:
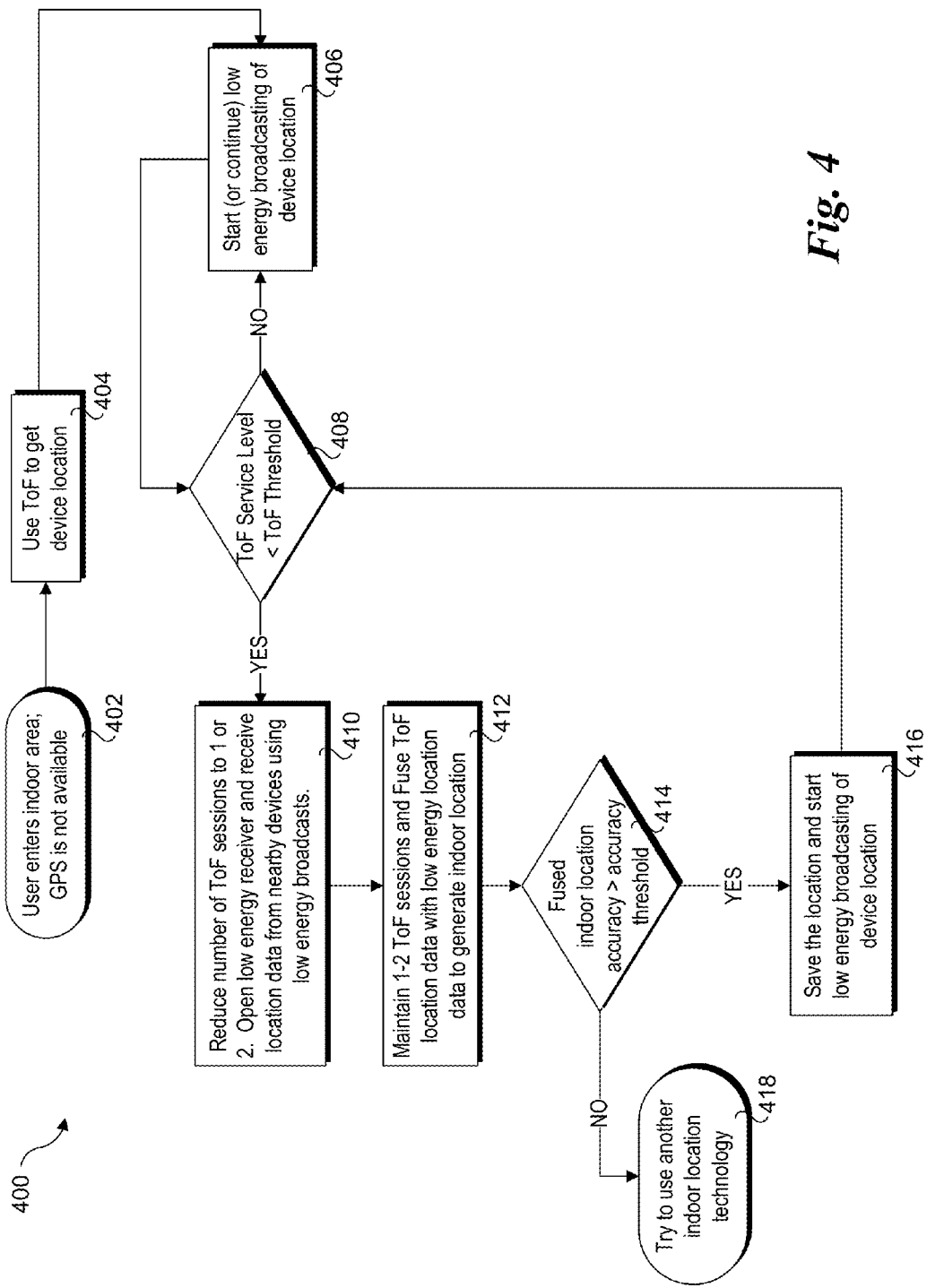
FIG. 4 is a flowchart illustrating operations and logic performed by mobile devices to facilitate implementation of aspects of the location determination embodiments discussed herein.

With reference to flowchart 400 of FIG. 4, in one embodiment the following process is used to implement the location sharing mechanism. The process begins in a start block 402, where a user enters an indoor area under which GPS is either unavailable and/or the user's device does not support GPS. In a block 404 the user's device uses a ToF-based location scheme to get the device's location. For example, in one embodiment, the process illustrated in FIGS. 1-3 is used to establish the device's location using 3 or 4 ToF sessions and trilateration or quadlateration. Optionally, another ToF process may be used in combination with trilateration or quadlateration, as applicable.

Once an accurate indoor location is established using ToF, the device begins to share it location by using the low energy location sharing mechanism to anonymously broadcast its location to other nearby devices, as depicted in a block 406. Details of the low energy broadcasting of a device's location is described below with reference to FIGS. 5 and 6.

In a block 408 a determination is made to whether the ToF service level is less than a ToF threshold. Generally, the service level indicator may be determined based on known variables such as transmission retries, packet loss percentage and other channel estimation indicators. When a device's ToF service level drops below the threshold, which represents a significant decrease in the indoor location accuracy, the answer to decision block 408 is NO, causing the logic to proceed to a block 410 in which two operations are performed substantially concurrently. First, the devices reduces the number of ToF session to only 1 or 2 sessions. For example, the device could selectively disconnect from the most-loaded access points or from the most distant ones. Second, the device opens its low energy receiver in order to receive low energy location broadcasts from other nearby devices.

In a block 412, while maintaining 1 or 2 ToF sessions, the device fuses the ToF location data with the low energy location data received from nearby devices to generate an updated location. If the device has received low energy location broadcasts from other nearby devices (via the low energy location sharing mechanism), in a block 414 the device checks its fused location accuracy according to a fusing algorithm. If the fused accuracy is accurate enough (e.g., larger than an accuracy threshold), resulting in a YES determination by decision block 414, the device maintains this operating state until the Wi-Fi ToF service level improves or until the device stops using the indoor location. During this operating state, the device saves the fused location and starts low energy broadcasting of the fused location, as depicted in a block 418. The logic then returns to decision block 408. If the answer to decision block 414 is NO, the logic proceeds to an exit block 418 in which it may try to use another indoor location technology (if available), or otherwise exit the process.

As shown by the loop from decision block 408 to block 408 and then back to decision block 406, the ToF service level is measured on an ongoing basis. As a result, the logic may also periodically loop through the operations of blocks 410, 412, 414, 416, and 418.

FIG. 5*a* shows the operational state of device 110 at block 410. Prior to this state, device 110 had determined its location using ToF (block 404, as also illustrated in FIG. 1), and subsequently entered a state under which the ToF service level falls below the ToF threshold, resulting in the logic proceeding to block 410. Accordingly, device 110 reduces its 4 ToF sessions to 2 (in this example), dropping the ToF sessions with Wi-Fi access points 104 and 108. Device 110 then opens its low energy receiver (e.g., a low energy BLUETOOTH receiver in one embodiment) and begins receiving low energy broadcast of the locations of nearby devices, as depicted by devices 502 and 504.

As is further illustrated, each of device 110, 502, and 504 include a Wi-Fi radio subsystem 114 and a low energy BLUETOOTH® radio subsystem 506. Device 502 and 504 use the transmitters of their low energy BLUETOOTH® radio subsystems 510 to broadcast their respective locations (as depicted by location data 508 and 510) via broadcast signals 512 and 514. Generally, location data 508 and 510 will include an anonymous identifier (ID) and location coordinates corresponding to the most-recently determined location of the low energy broadcasting device. In addition, in some embodiments the low energy broadcast may include signal strength indicia identifying the strength of the broadcast signal transmitted from the low energy transmitter of the broadcasting device.

To produce an additional value from the other devices' location broadcasts the device collects time-related indoor location broadcasts with their indoor location, while determining an RSSI for the received signal. This process is depicted in FIG. 5*b*, which now focuses on location determination based on the low energy location sharing mechanism (while noting the ToF-related operations shown in FIG. 5*a* are still being performed concurrently). Measuring distance using RSSI is well-known and is used by location services such as those provided by APPLE and GOOGLE to enable iOS and ANDROID devices to determine their location. RSSI is a measurement of the power of a received radio signal. Since the power output by low energy BLUETOOTH® transmitters is either defined (via an applicable specification), or a specific signal strength indicia is included in the broadcast signal itself, RSSI can be used to determine the distance between the transmitter and the receiver with reasonable accuracy, particularly when the transmitter and receiver are close together.

In one embodiment, the RSSI measurement is used as raw data that is provided as an input to a proximity algorithm, which then processes the RSSI data and determines the distance between the broadcasting device and the receiving device. As shown in FIG. 5*b*, device 110 is depicted as calculating RSSI measurements 512R and 514R respectively corresponding to low energy broadcast signals 512 and 514 that are transmitted from devices 502, and 504, respectively. In this example, a device receives location data that is transmitted from two other devices using the low energy location sharing mechanism. Generally, a given device can employ location data provided using the low energy location sharing mechanism for one or more other devices. In the case of two devices, the points at which RSSI distance circles 516 and 518 (depicted as arcs in FIG. 5*b* dues to drawing size limitations) cross correspond to potential locations for device 110—the location at which device 110 is shown and a location 520. Since device 110 is still receiving and processing ToF location data from each of Wi-Fi access points 102 and 106, it determines that the location shown is the correct location, and location 520 is incorrect.

Preferably, a given device will only consider broadcasts from nearby devices sharing their locations using the low energy location sharing mechanism, since the adverse effects of RSSI are substantially reduced when the distance between devices is small, making location determinations using the low energy location sharing mechanism from closer devices more accurate. In some embodiments, the preferred distance is approximately seven meters or less, although this is not meant to be limiting. Accordingly, in such embodiments if the RSSI distance determination results in a distance greater than a threshold distance, the location data from the corresponding low energy broadcasting device is ignored. Optionally or in addition to, the RSSI measurement itself may be used to determine whether or not to include the location data from a given low energy broadcasting device in determining the location of a device receiving the low energy broadcast signals.

As discussed above with reference to block 412 of flowchart 400, the next operation of the process is fusing the ToF location input and the low energy broadcasts input. In one embodiment, the two inputs are fused using another algorithm that outputs the fused location and an estimated error level. The error level suggests the matching level between the ToF location and the low energy broadcasts location. It is noted that this algorithm could also use the raw data of both inputs. Generally, the fusing algorithm may be implemented using well-known techniques for fusing (i.e., combining) the input data to determine an updated location for the device, including but not limited to weighting the input data (e.g., in one embodiment the ToF data is given more weight such that after confirming the error level meets the matching criteria, the location of the device either uses the ToF location or a weighted average of the locations. Under other approached, the locations may be combined such that the new location is an average of the ToF and low-energy broadcast location determinations.

If the error level is low, meaning the locations determined using the ToF-based scheme and the location determined using low energy broadcasts have a good match, the location would be considered as valid and the process of fusing the two inputs would continue. If the error level between the two locations is too high, meaning the two locations do not have a good match, the process is terminated and the device would go back to ToF or other types of indoor location techniques to determine its location.

During subsequent operation, the device maintains a lower number of ToF sessions (1 or 2 for example) in order to match to the low energy broadcasts indoor location. When the device is sensing a better ToF service level according to the service level indicator it would hint the device that it can use ToF technology only to produce the indoor location.

Figure 6:
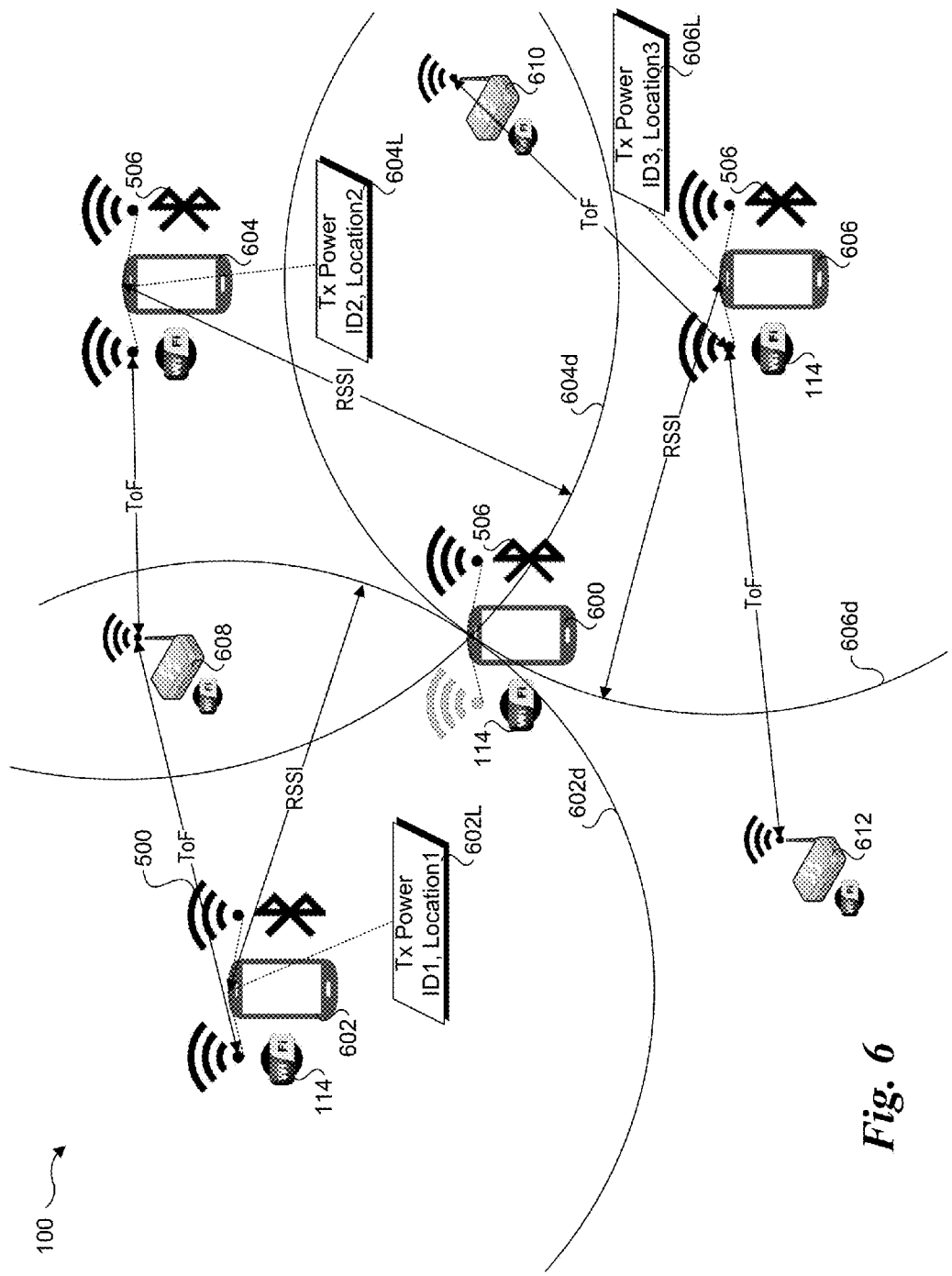
FIG. 6 is a schematic diagram illustrating a mobile device determining its location via trilateration based on RSSI signal measurements from three nearby mobile devices.

FIG. 6 shows an example of how a device 600 is enabled to determine its location by using trilateration of low energy broadcast signals received from three other devices 602, 604, and 606. Each of devices 602, 604, and 606 currently has 1 or 2 ToF sessions (with Wi-Fi access points 608, 610, and 612), and has determined its location with sufficient accuracy such that it has begun broadcasting its respective location using the lower energy location sharing mechanism. As is further depicted, the Wi-Fi radio subsystem of device 600 is disabled (for illustrative purposes; it may also be enabled), while its BLUETOOTH® radio subsystem 506 is enabled and its low energy receiver is configured to receive low energy broadcasts from other devices. Generally, the low energy broadcasts use low transmitter power to prevent an increased noise level in the surroundings, which results in only nearby receivers receiving the broadcasts. In one embodiment, the low energy broadcast includes a location messages that is anonymously broadcasted (could be obtained by privacy features implemented in the BLUETOOTH® Low Energy privacy for instance), and contain information identifying the Tx power, an autonomous identifier (ID), and the location of the broadcasting device (e.g., in longitude, latitude coordinates), as depicted by the broadcast of location data 602L, 604L, and 606L. In accordance with the Tx power and the RSSI measurement, the receiving device (600) is enabled to calculate the distance between each broadcaster and itself. In FIG. 6, the respective distances to devices 602, 604, and 606 are depicted by arcs 602d, 604d, and 606d. In one embodiment, if this distance is relatively small (e.g., 3-7 meters), depending on the technology, the location input is considered as an input to the fused location algorithm. Otherwise (e.g., distance >7 meters), the location input is considered as unreliable (due to inaccuracies in determining distances using low power RSSI measurements) and is not employed as an input to the fused location algorithm.

In addition to trilateration, a device may also determine its location using the low energy location sharing mechanism based on location data broadcast by two or more devices or even a single device. Generally, when received location data is input from multiple devices, multi-lateration is performed to determine the receiving device's location. In an example under which a device's location may be determined based on location information received from a single low energy broadcasting device, let's say a first device that has Wi-Fi disabled (or at least either has ToF turned off or ToF is otherwise unsupported on the first device) detects it is within 3-4 meters or less of a second device that is broadcasting it location using the low energy location sharing mechanism. This distance is so close that the first device could consider itself to be co-located with the second device, and thus use the second device's location. For the vast, vast majority applications, this location determination (when also considering the accuracy of the location determined by the second device) is well within the accuracy requirements of the application. Moreover, obtaining the first device's location using the low energy location sharing mechanism will likely result in a more accurate location determination than using the conventional approach of using RSSI measurements of multiple Wi-Fi access points to trilaterate the device's location.

Figure 7:
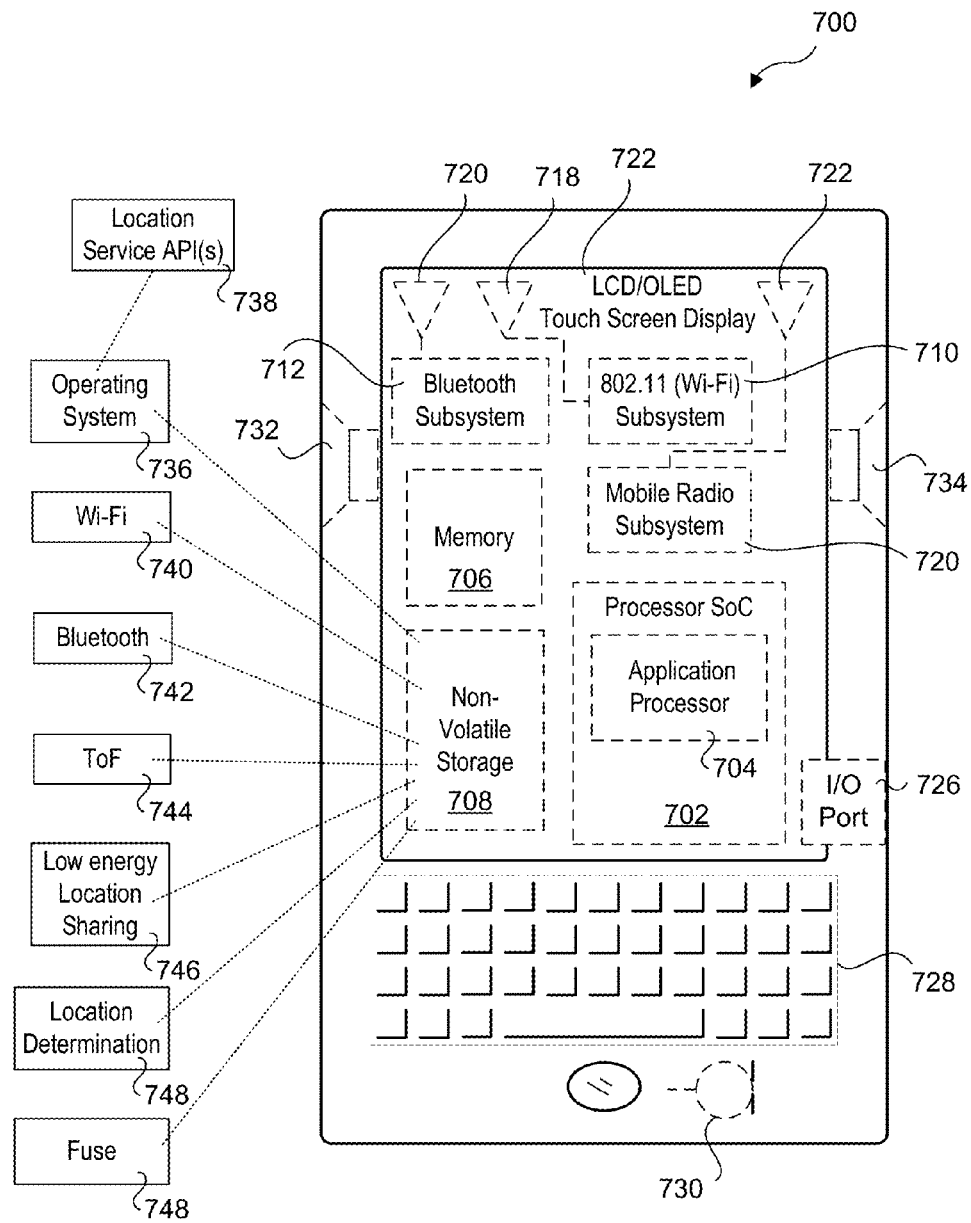
FIG. 7 is a schematic diagram of an exemplary mobile device configured to implement aspects of embodiments described herein.

FIG. 7 shows a mobile device 700 that includes various software modules to support operation of mobile device 700 as both a low energy location broadcaster and receiver, in accordance with aspects of the embodiments described herein. Mobile device 700 is generally illustrative of a variety of types of mobile devices, including mobile phones, tablets, laptop computers, notebooks, Chromebooks, media players, and any other type of mobile device that may include a Wi-Fi radio subsystem and a low energy radio subsystem, such as but not limited to BLUETOOTH® low energy. Mobile device 700 also may be implemented (only) as a low energy broadcast receiving device, in which case the inclusion of a Wi-Fi radio subsystem (and associated ToF operations) is optional.

Mobile device 700 includes a processor System on a Chip (SoC) 702 including an application processor 704 that includes one or more cores. Processor SoC 702 is operatively coupled to each of memory 706, non-volatile storage 708, an IEEE 802.11 (Wi-Fi) subsystem 710, and a BLU- ETOOTH® sub-system 712, the latter two of which are coupled to a respective antenna 716 and 718. If mobile device 700 comprises a mobile phone, or otherwise is a mobile device that includes facilities for accessing a mobile network, mobile device 700 further includes a mobile radio subsystem 720 coupled to an antenna 722. It is noted that the functions of two or more of antennae 716, 718, and 722 may be implemented with a single antenna in some embodiments.

In embodiments under which mobile device 700 is a mobile phone or tablet, mobile device 700 includes a display screen 724 comprising a liquid crystal display (LCD) screen, or other type of display screen such as an organic light emitting diode (OLED) display. Display screen 724 may be configured as a touch screen though use of capacitive, resistive, or another type of touch screen technology. Mobile device 700 further includes, an I/O port 726, a virtual or physical keyboard 728, a microphone 730, and a pair of speakers 732 and 734.

During operation, software instructions and modules comprising an operating system 736 including location services API(s) 738, Wi-Fi module 740, a BLUETOOTH® module 742, a ToF module 744, a low energy location sharing module 746, a location determination module 748, and a Fuse module 750 are loaded from non-volatile storage 710 into memory 708 for execution on an applicable processing element (e.g., a core) on processor SoC 702. For example, these software components and modules, as well as other software instructions are stored in non-volatile storage 710, which may comprises any type of non-volatile storage device, such as Flash memory. In addition to software instructions, a portion of the instructions for facilitating various operations and functions herein may comprise firmware instructions that are stored in non-volatile storage 710 or another non-volatile storage device (not shown).

Generally, operating system 736 may comprise any existing or future operating system, including but not limited to APPLE® iOS™, GOOGLE® ANDROID™, MICROSOFT® WINDOWS™ and WINDOWS PHONE™, BLACKBERRY® OS or QNS operating systems, and various flavors of Linux operating systems. The location service API(s) 738 vary by operating system, and may or may not include a local database of Wi-Fi access point locations. In some embodiments, location service API(s) may offload the location of a given device using ToF to a location services server, wherein the ToF data is sent to the server, which processes the data and returns a determined device location (e.g., returns the longitude and latitude of the device).

Wi-Fi module 740 includes instructions for configuring Wi-Fi subsystem 710 and facilitating communication sessions using Wi-Fi connections with Wi-Fi access points. This includes applicable 802.11 network stack layers, in addition to application layer software. Similarly, BLUETOOTH® module 742 includes instructions for configuring BLUETOOTH® radio subsystem 712, including applicable BLUETOOTH® network stack layers and application layer software.

ToF module 740 includes instructions for implementing operations related to usages of ToF to determine a device's location, as described herein. In addition to a configuration under which the instructions of Tof module 740 are executed on application processor 704, all or a portion of the ToF module functionality may be implemented as embedded logic and/or embedded software in Wi-Fi radio subsystem 710. For example, Wi-Fi radio subsystem 710 may comprise a Wi-Fi chip with built-in ToF support.

Low energy location sharing module 746 includes instructions for implementing aspects of the lower energy location sharing mechanism described herein. In addition to a configuration under which the instructions of Low energy location sharing module are executed on application processor 704, all or a portion of the Low energy location sharing module functionality may be implemented as embedded logic and/or embedded software in BLUETOOTH®radio subsystem 712.

Location determination module 748 includes instructions for facilitating location determination operations using applicable input data, such as ToF measurements and RSSI measurements. For example, location determination module 748 includes instructions for performing multi-lateration based on ToF measurements and RSSI measurements. Location determination module 748 also includes instructions for implementing the general operations and logic of flowchart 400. In addition, fuse module 748 includes instructions for implementing the fuse algorithm described herein.

In addition to the configuration shown in FIG. 7, location determination operations may also be done in an offload engine or the like. The offload engine may be implemented using well-known techniques, such as but not limited to implementation in a separate off-load engine chip, or as embedded logic in an existing chip. Moreover, either or both the ToF measurements and the low-energy broadcast RSSI measurements may be implemented in the Wi-Fi radio subsystem and the low-energy radio subsystem, respectfully.

Further aspects of the subject matter described herein are set out in the following numbered clauses:

1. A mobile device comprising:
 a processor;
 memory, operatively coupled to the processor;
 an Institute of Electrical and Electronics Engineers (IEEE) 802.11-based (Wi-Fi) radio subsystem, operatively coupled to the processor and to an antenna;
 a low energy radio subsystem, operatively coupled to the processor and to an antenna; and
 a non-volatile storage device, operatively coupled to the processor, having a plurality of instructions stored therein configured, upon execution by the processor, to enable the mobile device to,
 determine a location of the mobile device using a Time of Flight (ToF) location scheme; and
 broadcast the location of the mobile device as determined by the ToF location scheme using the low energy radio subsystem.

2. The mobile device of clause 1, wherein the instructions are further configured to enable the mobile device to:
 establish a ToF session with two or more ToF-enabled Wi-Fi access points;
 for each of the one or more ToF-enabled Wi-Fi access points,
 perform a ToF message exchange with the ToF-enabled Wi-Fi access point to determine a ToF-based distance between the mobile device and the ToF-enabled Wi-Fi access point;
 retrieve information identifying the location of each of the ToF-enabled access points; and
 employ the location of each of the ToF-enabled access points and the ToF-based distances between the mobile device and the ToF-enabled Wi-Fi access points to determine the location of the mobile device using multi-lateration.

3. The mobile device of clause 2, wherein the instructions are further configured to enable the mobile device to:
 determine that a ToF service level exceeds a threshold; and one of initiate and continue to broadcast the location of the mobile device using the low energy radio subsystem.

4. The mobile device of clause 2, wherein three or more ToF sessions are established, and wherein the low energy radio subsystem includes a low energy receiver, the method further comprising:
reduce a number of ToF sessions to 1 or 2 ToF sessions;
receive location data broadcast from one or more nearby mobile devices that are broadcasting their respective location using a low energy broadcast; and
determine an updated location for the mobile device by combining location data obtained using the 1 or 2 ToF sessions with location data received from the one or more nearby mobile devices via one or more respective low energy broadcasts.

5. The mobile device of clause 4, wherein the updated location is determined using a fusing algorithm that compares a first location for the mobile device determined using ToF-based distances to a second location for the mobile device determined via location data received from the one or more nearby mobile devices to determine whether the first and second locations match within a match threshold.

6. The mobile device of clause 4 or 5, wherein the instructions are further configured to enable the mobile device to:
for each of one or more nearby mobile devices,
receive a low energy broadcast signal including broadcast signal power data and location information for the nearby mobile device;
perform a Received Signal Strength Indicator (RSSI) measurement of the received low energy broadcast signal;
calculate a distance between the mobile device and the nearby mobile device using the RSSI measurement and the broadcast signal power data.

7. The mobile device of clause 6, wherein there are two or more nearby mobile devices for which distances between the mobile device and the two or more nearby mobile devices are calculated, and wherein the instructions are further configured to enable the mobile device to determine a location of the mobile device using multi-lateration.

8. The mobile device of any of clauses 4-7, wherein the instructions are further configured to enable the mobile device to broadcast the updated location of the mobile device as determined using the low energy radio subsystem.

9. The mobile device of any of clauses 4-8, wherein the instructions are further configured to enable the mobile device to:
receive location data broadcast from a second mobile device that is broadcasting its location using a low energy broadcast signal;
at least one of determine a distance between the mobile device and the second mobile device exceeds a threshold and detect a signal level of the low energy broadcast signal falls below a threshold, and in response thereto,
not using the location data broadcast from the second mobile device in determining an updated position of the mobile device.

10. The mobile device of any of the proceeding clauses, wherein the low energy radio subsystem comprises a Bluetooth radio subsystem.

11. A method performed by a mobile device including an Institute of Electrical and Electronics Engineers (IEEE) 802.11-based (Wi-Fi) radio subsystem, and a low energy radio subsystem, the method comprising:
determining a location of the mobile device using a Time of Flight (ToF) location scheme; and
broadcasting the location of the mobile device as determined by the ToF location scheme using the low energy radio subsystem.

12. The method of clause 11, further comprising:
establishing a ToF session with two or more ToF-enabled Wi-Fi access points;
for each of the one or more ToF-enabled Wi-Fi access points,
performing a ToF message exchange with the ToF-enabled Wi-Fi access point to determine a ToF-based distance between the mobile device and the ToF-enabled Wi-Fi access point; and
retrieving information identifying the location of each of the ToF-enabled access points; and
employing the location of each of the ToF-enabled access points and the ToF-based distances between the mobile device and the ToF-enabled Wi-Fi access points to determine the location of the mobile device using multi-lateration.

13. The method of clause 12, further comprising:
determining that a ToF service level exceeds a threshold; and
one of initiate and continue to broadcast the location of the mobile device using the low energy radio subsystem.

14. The method of clause 12 or 13, wherein at least three ToF sessions are established, wherein the low energy radio subsystem includes a low energy receiver, and wherein the instructions are further configured to enable the mobile device to:
reducing a number of ToF sessions to 1 or 2 ToF sessions;
receiving location data broadcast from one or more nearby mobile devices that are broadcasting their respective location using a low energy broadcast; and
determining an updated location for the mobile device by combining location data obtained using the 1 or 2 ToF sessions with location data received from the one or more nearby mobile devices via one or more respective low energy broadcasts.

15. The method of clause 14, wherein the updated location is determined using a fusing algorithm that compares a first location for the mobile device determined using ToF-based distances to a second location for the mobile device determined via location data received from the one or more nearby mobile devices to determine whether the first and second locations match within a match threshold.

16. The method of clause 14 or clause 15, further comprising:
for each of one or more nearby mobile devices,
receiving a low energy broadcast signal including broadcast signal power data and location information for the nearby mobile device;
performing a Received Signal Strength Indicator (RSSI) measurement of the received low energy broadcast signal;
calculating a distance between the mobile device and the nearby mobile device using the RSSI measurement and the broadcast signal power data.

17. The method of clause 16, wherein there are two or more nearby mobile devices for which distances between the mobile device and the two or more nearby mobile devices are calculated, and the method further comprises determining a location of the mobile device using multi-lateration.

18. The method of any of clauses 14-17, further comprises updating the location of the mobile device as determined using a low energy radio subsystem.

19. The method of any of clauses 14-18, further comprising:

receiving location data broadcast from a second mobile device that is broadcasting its location using a low energy broadcast signal;

at least one determining a distance between the mobile device and the second mobile device exceeds a threshold and detecting a signal level of the low energy broadcast signal falls below a threshold, and in response thereto, ignoring the location data broadcast from the second mobile device in determining an updated position of the mobile device.

20. The method of any of clauses 11-19, wherein the low energy radio subsystem comprises a Bluetooth radio subsystem.

21. A tangible non-transitory machine-readable medium, having instructions stored thereon configured to be executed on the mobile device to enable the mobile device to perform the method of any of clauses 11-20.

22. A mobile device comprising:

a processor;

memory, operatively coupled to the processor;

a low energy radio subsystem, operatively coupled to the processor and to an antenna, including a low energy transmitter and low energy receiver; and a non-volatile storage device, operatively coupled to the processor, having a plurality of instructions stored therein configured, upon execution by the processor, to enable the mobile device to, receive, via the low energy receiver, location data broadcast from one or more nearby mobile devices that are broadcasting their respective location using a low energy broadcast signal; and determine a location for the mobile device by processing the location data that is received via the low energy receiver.

23. The mobile device of clause 22, wherein the instructions are further configured to enable the mobile device to:

for each of one or more nearby mobile devices, receive a low energy broadcast signal including broadcast signal power data and location information for the nearby mobile device;

perform a Received Signal Strength Indicator (RSSI) measurement of the received low energy broadcast signal;

calculate a distance between the mobile device and the nearby mobile device using the RSSI measurement and the broadcast signal power data.

24. The mobile device of clause 23, wherein the mobile device calculates a distance between itself and at least two nearby mobile devices, and wherein the instructions are further configured to enable the mobile device to determine its location using multi-lateration using the calculated distances and the location information broadcast by the at least two nearby mobile devices using low energy broadcast signals.

25. The mobile device of clause 23 or 24, wherein the instructions are further configured to enable the mobile device to:

determine that a calculated distance between the mobile device and a nearby mobile device that is broadcasting location data via a low energy broadcast signal is below a threshold; and set the location of the mobile device to be the same as the location of the nearby mobile device.

26. The mobile device of any of clauses 22-25, wherein the low energy radio subsystem comprises a Bluetooth radio subsystem.

27 A method performed by a mobile device having a low energy radio subsystem including a low energy receiver, the method comprising:

receiving, via the low energy receiver, location data broadcast from one or more nearby mobile devices that are broadcasting their respective location using a low energy broadcast signal; and determining a location for the mobile device by processing the location data that is received via the low energy receiver.

28. The method of clause 27, further comprising:

for each of one or more nearby mobile devices, receiving a low energy broadcast signal including broadcast signal power data and location information for the nearby mobile device;

performing a Received Signal Strength Indicator (RSSI) measurement of the received low energy broadcast signal;

calculating a distance between the mobile device and the nearby mobile device using the RSSI measurement and the broadcast signal power data.

29. The method of clause 28, wherein the mobile device calculates a distance between itself and at least two nearby mobile devices, the method further comprising determining the location of the mobile device by performing multi-lateration using the calculated distances and the location information broadcast by the at least two nearby mobile devices using low energy broadcast signals.

30. The method of clause 28 or 29, further comprising:

determining that a calculated distance between the mobile device and a nearby mobile device that is broadcasting location data via a low energy broadcast signal is below a threshold; and setting the location of the mobile device to be the same as the location of the nearby mobile device.

31. The method of any of clauses 27-30, wherein the low energy radio subsystem comprises a Bluetooth radio subsystem.

32. A tangible non-transitory machine-readable medium, having instructions stored thereon configured to be executed on the mobile device to enable the mobile device to perform the method of any of clauses 27-31.

32. A mobile device having a low energy radio subsystem including a low energy receiver and means for performing the method of any of clauses 27-31.

33. A mobile device including comprising:

a processor;

an Institute of Electrical and Electronics Engineers (IEEE) 802.11-based (Wi-Fi) radio subsystem, operatively coupled to the processor and to an antenna;

a low energy radio subsystem, operatively coupled to the processor and to an antenna; and means for, determining a location of the mobile device using a Time of Flight (ToF) location scheme; and broadcasting the location of the mobile device as determined by the ToF location scheme using the low energy radio subsystem.

34. The mobile device of clause 33, further comprising means for:

establishing a ToF session with two or more ToF-enabled Wi-Fi access points;

for each of the one or more ToF-enabled Wi-Fi access points, performing a ToF message exchange with the ToF-enabled Wi-Fi access point to determine a ToF-based distance between the mobile device and the ToF-enabled Wi-Fi access point;

retrieving information identifying the location of each of the ToF-enabled access points; and employing the location of each of the ToF-enabled access points and the ToF-based distances between the mobile device and the ToF-enabled Wi-Fi access points to determine the location of the mobile device using multi-lateration.

35. The mobile device of clause 34, further comprising means for:
    determining that a ToF service level exceeds a threshold; and
    one of initiating and continuing to broadcast the location of the mobile device using the low energy radio subsystem.

36. The mobile device of clause 34 or 35, wherein three or more ToF sessions are established, and wherein the low energy radio subsystem includes a low energy receiver, further comprising means for:
    reducing a number of ToF sessions to 1 or 2 ToF sessions;
    receiving location data broadcast from one or more nearby mobile devices that are broadcasting their respective location using a low energy broadcast; and
    determining an updated location for the mobile device by combining location data obtained using the 1 or 2 ToF sessions with location data received from the one or more nearby mobile devices via one or more respective low energy broadcasts.

37. The mobile device of clause 36, wherein the updated location is determined using a fusing algorithm that compares a first location for the mobile device determined using ToF-based distances to a second location for the mobile device determined via location data received from the one or more nearby mobile devices to determine whether the first and second locations match within a match threshold.

38. The mobile device of clause 36 or 37, further comprising means for:
    for each of one or more nearby mobile devices,
    receiving a low energy broadcast signal including broadcast signal power data and location information for the nearby mobile device;
    performing a Received Signal Strength Indicator (RSSI) measurement of the received low energy broadcast signal;
    calculating a distance between the mobile device and the nearby mobile device using the RSSI measurement and the broadcast signal power data.

39. The mobile device of clause 38, wherein there are two or more nearby mobile devices for which distances between the mobile device and the two or more nearby mobile devices are calculated, and wherein the mobile device further includes means for determining a location of the mobile device using multi-lateration.

40. The mobile device of any of clauses 36-39, further comprising means for broadcasting the updated location of the mobile device as determined using the low energy radio subsystem.

41. The mobile device of any of clauses 36-40, further comprising means for:
    receiving location data broadcast from a second mobile device that is broadcasting its location using a low energy broadcast signal;
    at least one of determining a distance between the mobile device and the second mobile device exceeds a threshold and detecting a signal level of the low energy broadcast signal falls below a threshold, and in response thereto,
    not using the location data broadcast from the second mobile device in determining an updated position of the mobile device.

42. The mobile device of any of clauses 33-41, wherein the low energy radio subsystem comprises a Bluetooth radio subsystem.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A mobile device comprising:
a processor;
memory, operatively coupled to the processor;
an Institute of Electrical and Electronics Engineers (IEEE) 802.11-based (Wi-Fi) radio subsystem, operatively coupled to the processor and to an antenna;
a low energy radio subsystem, operatively coupled to the processor and to an antenna; and
a non-volatile storage device, operatively coupled to the processor, having a plurality of instructions stored therein configured, upon execution by the processor, to enable the mobile device to,
   determine a location of the mobile device using a Time of Flight (ToF) location scheme employing three or more ToF-enabled Wi-Fi access points;
   broadcast the location of the mobile device as determined by the ToF location scheme using the low energy radio subsystem;
   reduce a number of ToF sessions to 1 or 2 ToF sessions;
   receive, via the low energy radio subsystem, location data broadcast from one or more nearby mobile devices that are broadcasting their respective location using a low energy broadcast; and
   determine an updated location for the mobile device by combining location data obtained using the 1 or 2 ToF sessions with location data received from the one or more nearby mobile devices via one or more respective low energy broadcasts.

2. The mobile device of claim 1, wherein the instructions are further configured to enable the mobile device to:
   establish a ToF session with two or more ToF-enabled Wi-Fi access points;
   for each of the one or more ToF-enabled Wi-Fi access points,
      perform a ToF message exchange with the ToF-enabled Wi-Fi access point to determine a ToF-based distance between the mobile device and the ToF-enabled Wi-Fi access point;
   retrieve information identifying the location of each of the ToF-enabled access points; and
   employ the location of each of the ToF-enabled access points and the ToF-based distances between the mobile device and the ToF-enabled Wi-Fi access points to determine the location of the mobile device using multi-lateration.

3. A mobile device comprising:
a processor;
memory, operatively coupled to the processor;
an Institute of Electrical and Electronics Engineers (IEEE) 802.11-based (Wi-Fi) radio subsystem, operatively coupled to the processor and to an antenna;
a low energy radio subsystem, operatively coupled to the processor and to an antenna and including a transmitter and receiver; and
a non-volatile storage device, operatively coupled to the processor, having a plurality of instructions stored therein configured, upon execution by the processor, to enable the mobile device to,
   determine a location of the mobile device using a Time of Flight (ToF) location scheme employing two or more ToF-enabled Wi-Fi access points;
   determine that a ToF service level exceeds a threshold; and if the ToF service level is determined to exceed the threshold, one of initiate and continue to broadcast the location of the mobile device using the low energy radio subsystem.

4. The mobile device of claim 1, wherein the updated location is determined using a fusing algorithm that compares a first location for the mobile device determined using ToF-based distances to a second location for the mobile device determined via location data received from the one or more nearby mobile devices to determine whether the first and second locations match within a match threshold.

5. The mobile device of claim 1, wherein the instructions are further configured to enable the mobile device to:
for each of one or more nearby mobile devices,
receive a low energy broadcast signal including broadcast signal power data and location information for the nearby mobile device;
perform a Received Signal Strength Indicator (RSSI) measurement of the received low energy broadcast signal;
calculate a distance between the mobile device and the nearby mobile device using the RSSI measurement and the broadcast signal power data.

6. The mobile device of claim 5, wherein there are two or more nearby mobile devices for which distances between the mobile device and the two or more nearby mobile devices are calculated, and wherein the instructions are further configured to enable the mobile device to determine a location of the mobile device using multi-lateration.

7. The mobile device of claim 1, wherein the instructions are further configured to enable the mobile device to broadcast the updated location of the mobile device as determined using the low energy radio subsystem.

8. The mobile device of claim 1, wherein the instructions are further configured to enable the mobile device to:
receive location data broadcast from a second mobile device that is broadcasting its location using a low energy broadcast signal;
at least one of determine a distance between the mobile device and the second mobile device exceeds a threshold and detect a signal level of the low energy broadcast signal falls below a threshold, and in response thereto, not using the location data broadcast from the second mobile device in determining an updated position of the mobile device.

9. The mobile device of claim 1, wherein the low energy radio subsystem comprises a Bluetooth radio subsystem.

10. A method performed by a mobile device including an Institute of Electrical and Electronics Engineers (IEEE) 802.11-based (Wi-Fi) radio subsystem, and a low energy radio subsystem, the method comprising:
determining a location of the mobile device using a Time of Flight (ToF) location scheme employing three or more ToF-enabled Wi-Fi access points;
broadcasting the location of the mobile device as determined by the ToF location scheme using the low energy radio subsystem;
reducing a number of ToF sessions to 1 or 2 ToF sessions;
receiving location data broadcast from one or more nearby mobile devices that are broadcasting their respective location using a low energy broadcast; and
determining an updated location for the mobile device by combining location data obtained using the 1 or 2 ToF sessions with location data received from the one or more nearby mobile devices via one or more respective low energy broadcasts.

11. The method of claim 10, further comprising:
establishing a ToF session with two or more ToF-enabled Wi-Fi access points;
for each of the one or more ToF-enabled Wi-Fi access points,
performing a ToF message exchange with the ToF-enabled Wi-Fi access point to determine a ToF-based distance between the mobile device and the ToF-enabled Wi-Fi access point; and
retrieving information identifying the location of each of the ToF-enabled access points; and
employing the location of each of the ToF-enabled access points and the ToF-based distances between the mobile device and the ToF-enabled Wi-Fi access points to determine the location of the mobile device using multi-lateration.

12. A method performed by a mobile device including an Institute of Electrical and Electronics Engineers (IEEE) 802.11-based (Wi-Fi) radio subsystem, and a low energy radio subsystem including a transmitter and receiver, the method comprising:
determining a location of the mobile device using a Time of Flight (ToF) location scheme employing two or more ToF-enabled Wi-Fi access points;
broadcasting the location of the mobile device as determined by the ToF location scheme using the low energy radio subsystem;
determining that a ToF service level exceeds a threshold; and
if the ToF service level is determined to exceed the threshold, one of initiate and continue to broadcast the location of the mobile device using the low energy radio subsystem.

13. The method of claim 10, wherein the updated location is determined using a fusing algorithm that compares a first location for the mobile device determined using ToF-based distances to a second location for the mobile device determined via location data received from the one or more nearby mobile devices to determine whether the first and second locations match within a match threshold.

14. The method of claim 10, further comprising:
for each of one or more nearby mobile devices,
receiving a low energy broadcast signal including broadcast signal power data and location information for the nearby mobile device;
performing a Received Signal Strength Indicator (RSSI) measurement of the received low energy broadcast signal;
calculating a distance between the mobile device and the nearby mobile device using the RSSI measurement and the broadcast signal power data.

15. The method of claim 14, wherein there are two or more nearby mobile devices for which distances between the mobile device and the two or more nearby mobile devices are calculated, and the method further comprises determining a location of the mobile device using multi-lateration.

16. The method of claim 10, further comprises updating the location of the mobile device as determined using a low energy radio subsystem.

17. The method of claim 10, further comprising:
receiving location data broadcast from a second mobile device that is broadcasting its location using a low energy broadcast signal;
at least one determining a distance between the mobile device and the second mobile device exceeds a threshold and detecting a signal level of the low energy broadcast signal falls below a threshold, and in response thereto, ignoring the location data broadcast from the second mobile device in determining an updated position of the mobile device.

18. The method of claim 10, wherein the low energy radio subsystem comprises a Bluetooth radio subsystem.

19. A mobile device comprising:

a processor;

memory, operatively coupled to the processor;

a low energy radio subsystem, operatively coupled to the processor and to an antenna, including a low energy transmitter and low energy receiver; and a non-volatile storage device, operatively coupled to the processor, having a plurality of instructions stored therein configured, upon execution by the processor, to enable the mobile device to, receive, via the low energy receiver, a low energy broadcast signal including broadcast signal power data and location information from one or more nearby mobile devices that are broadcasting their respective location;

for each low energy broadcast signal received from a nearby mobile device, determine a location for the mobile device by processing the location data that is received via the low energy receiver;

perform a Received Signal Strength Indicator (RSSI) measurement of the received low energy broadcast signal; and calculate a distance between the mobile device and the nearby mobile device using the RSSI measurement and the broadcast signal power data;

determine that a calculated distance between the mobile device and a nearby mobile device that is broadcasting location data via a low energy broadcast signal is below a threshold; and set the location of the mobile device to be the same as the location of the nearby mobile device.

20. The mobile device of claim 19, wherein the mobile device calculates a distance between itself and at least two nearby mobile devices, and wherein the instructions are further configured to enable the mobile device to determine its location using multi-lateration using the calculated distances and the location information broadcast by the at least two nearby mobile devices using low energy broadcast signals.

21. The mobile device of claim 19, wherein the low energy radio subsystem comprises a Bluetooth radio subsystem.

* * * * *